United States Patent
Schmidt et al.

(10) Patent No.: US 6,854,021 B1
(45) Date of Patent: Feb. 8, 2005

(54) COMMUNICATIONS BETWEEN PARTITIONS WITHIN A LOGICALLY PARTITIONED COMPUTER

(75) Inventors: Donald W. Schmidt, Stone Ridge, NY (US); John A. Aiken, Jr., Raleigh, NC (US); Frank W. Brice, Jr., Hurley, NY (US); Janet R. Easton, Woodstock, NY (US); Wolfgang Eckert, Altdorf (DE); Marcus Eder, Stuttgart (DE); Steven G. Glassen, Wallkill, NY (US); Jeffrey P. Kubala, Poughquag, NY (US); Jeffrey M. Nick, West Park, NY (US); Jerry W. Stevens, Raleigh, NC (US); Ambrose A. Verdibello, Jr., Millbrook, NY (US); Harry M. Yudenfriend, Poughkeepsie, NY (US); Heinrich K. Lindner, Helsgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 09/677,454

(22) Filed: Oct. 2, 2000

(51) Int. Cl.[7] .............................................. G06F 13/14
(52) U.S. Cl. .............................. 710/5; 710/36; 710/52; 709/236; 712/13; 714/11
(58) Field of Search ................................ 710/5, 52, 33, 710/36, 310; 709/236; 712/13; 714/11

(56) References Cited

U.S. PATENT DOCUMENTS

| | | | | |
|---|---|---|---|---|
| 4,562,533 A | | 12/1985 | Hodel et al. ................ 364/200 |
| 4,843,541 A | * | 6/1989 | Bean et al. .................... 710/36 |
| 6,041,397 A | * | 3/2000 | Rickard et al. ............. 711/209 |
| 6,389,476 B1 | * | 5/2002 | Olnowich .................... 709/233 |
| 6,570,848 B1 | * | 5/2003 | Loughran et al. ........ 370/230.1 |
| 6,598,069 B1 | * | 7/2003 | Rooney et al. ............. 718/104 |
| 6,654,812 B2 | * | 11/2003 | Gioquindo et al. ......... 709/236 |
| 6,691,146 B1 | * | 2/2004 | Armstrong et al. ......... 718/100 |

* cited by examiner

Primary Examiner—Rehana Perveen
(74) Attorney, Agent, or Firm—Lynn L. Augspurger; Floyd A. Gonzalez

(57) ABSTRACT

Method and apparatus for sending data from one partition to a second partition within a logically partitioned computer. In a data processing system having multiple logical partitions, a send queue is established in the first logical partition, and a receive queue is established in the second logical partition. The send queue is registered in the send queue in a lookup table available to all of the logical partitions. The send queue is registered using as a key the logical partition identification of the first logical partition and the subchannel number (LPAR-ID.SUBCHANNEL#) of the subchannel assigned to the partition. The receive queue is registered in the lookup table using as a key, the internet protocol address of the receive queue in the second partition. A send instruction from the first logical partition is executed which interrogates the lookup table using the LPAR-ID.SUBCHANNEL# key to locate the send queue and IP address key to locate the receive queue, and sends the data in the send queue in the first logical partition to the receive queue in the second logical partition. This method and apparatus provides that discrete servers may be used in each logical partition, and data may be transferred between while maintaining security between the logical partitions.

15 Claims, 4 Drawing Sheets

COMMUNICATIONS BETWEEN PARTITIONS WITHIN A LOGICALLY PARTITIONED COMPUTER

FIELD OF THE INVENTION

The present invention relates to communications between processes in a multiprocessor system, and more particularly relates to communications between partitions within a logically partitioned computer.

BACKGROUND OF THE INVENTION

In a multiprocessor environment or a logically partitioned computer it is often desirable to move data from one processor to another, or from one partition to another. U.S. Pat. No. 4,562,533 issued Dec. 31, 1985 to Hodel et al. for DATA COMMUNICATIONS SYSTEM TO SYSTEM ADAPTER discloses a data processing system having multiple central systems and an adapter which is addressable by messages from each central system. The adapter provides handshake control, message synchronization and translation and the control of data being transmitted between a pair of central systems. The adapter includes a data buffer to provide intermediate storage of the information that is passed between the pair of central systems. A first message sequence is performed between a first, initiating central system and the adapter for transmitting information from the first central system to the adapter. A second message sequence is then performed between the adapter and a second, receiving central system for transmitting information from the adapter to the second central system.

Data may also be moved between servers in a physically partitioned computer. Data is typically moved to a shared intermediate area before it can be moved to the ultimate target server.

SUMMARY OF THE INVENTION

The present invention provides highly optimized any-to-any connectivity among discrete partitions or servers within a logically partitioned (LPAR) computer without requiring any physical cabling. Network latency is minimized because no physical I/O adapter is required to perform the desired data transfer among discrete servers within a computer. Instead, a direct memory copy is performed by the sending central processing unit (CPU) from one server's memory to the memory of the other partition. Since the links among the discrete server are only virtual, no additional cabling or physical configuration is required when logical partitions are configured within the same computer. If this support is hidden under the TCP/IP protocol (as an internally implemented cluster Local Area Network (LAN)), then applications can gain significant performance enhancements when communications occur via these virtual links, without any application changes. Security can be maintained among the partitions because the CPU I/O instruction is the only point of interception, since an adapter is not used for the communications. Since there is no physical media involved with these virtual links, the theoretical maximum bandwidth approaches that of the memory bus of the computer.

In the present invention, a centralized table defining the discrete servers within a computer is maintained in an area that is accessible by all the discrete servers. An I/O instruction detects that the target is connected via a virtual link. A lookup is performed within the centralized table to determine the target memory of the discrete server. Once the target is determined, the I/O instruction performs the data copy directly from the sender's buffer to the previously queued target's receive buffer. The target partition may then be notified that the data is available in its receiver buffer by either a polling model, an interrupt model, or a combination of both.

It is an object of the present invention to provide a method and apparatus for transferring data from a discrete server in one logical partition to a discrete server in another logical partition while preserving security between the partitions.

It is another object of the present invention to provide a method and apparatus for establishing a send queue in a first logical partition, establishing a receive queue in a second logical partition, registering the send queue in a lookup table available to all of the logical partitions, registering the receive queue in the lookup table, and executing a send instruction from the first partition which locates the send and receive queues in the lookup tables sends data in the send queue in the first logical partition to the receive queue in the second logical partition.

It is another object of the present invention to establish the send and receive queues in accordance with the direct input/output architecture.

It is another object of the present invention to store the lookup table in the hardware storage of the main storage of a data processing system.

It is another object of the invention to register the send queue using the logical partition identification and subchannel number of the first partition as the key.

It is another object of the invention to register the receive queue using the internet protocol address of the receive queue as the key.

It is another object of the invention to link the logical partition identification and subchannel number with internet protocol address with a queue control which points to the send queue and the receive queue.

It is another object of the invention to provide an indication in the hardware storage area which indicates when a send instruction from the subchannel of the first logical partition is to send data from the first partition to the second partition.

It is another object of the invention to provide a method an apparatus to include the IP address of the receive queue in the data stored in the send queue, execute a send instruction to search the lookup table for the logical partition identification and subchannel number to locate the send queue, to interrogate the data the send queue to find the IP address where the data is to be sent, to search the lookup table for the IP address to find the receive queue, and to complete the data transfer from the located send queue to the located receive queue.

These and other objects will be apparent to one skilled in the art from the following drawings and detailed description of the invention.

DESCRIPTION OF THE PREFERRED EMBODIMENT

Figure 1:
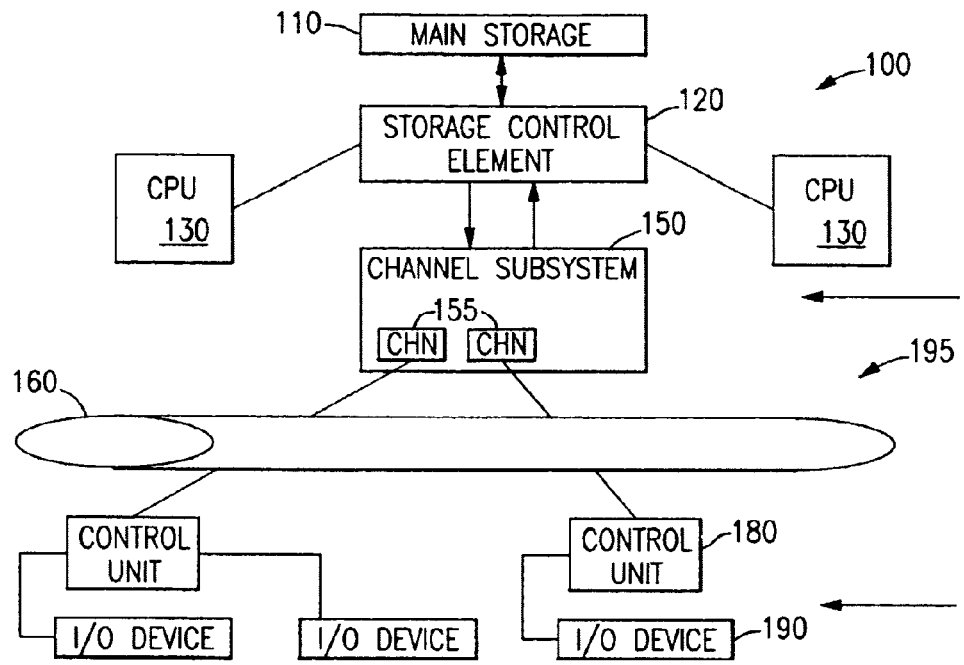
FIG. 1 is a schematic diagram of a network computing environment utilizing a channel subsystem usable with the present invention.

An example of an existing data processing system architecture is depicted in FIG. 1. As shown in FIG. 1, information is passed between the main storage 110, and one or more input/output devices (hereinafter I/O devices) 190, using channel subsystems 150. Through the switch 160, channel paths are established, comprising channels 155 and one or more control units shown at 180. These channel paths are the communication links established between the I/O devices 190 and the main storage for processing and exchange of information.

The main storage 110 stores data and programs which are input from I/O devices 190. Main storage is directly addressable and provides for high speed processing of data by central processing units and one or more I/O devices. One example of a main storage is a customer's storage area and a hardware system area (HSA) to be discussed later. I/O devices 190 pass information to or from main storage via facilities provided in the channel subsystem 250. Some examples of I/O devices include card readers and punches, magnetic-tape units, direct-access storage devices (DASD), displays, keyboards, printers, teleprocessing devices, communication controllers and sensor-based equipment.

The main storage is coupled to the storage control element (SCE) 120 which in turn is coupled to one or more central processing units (CPU) 130. The central processing unit(s) is the control center of the data processing system and typically comprises sequencing and processing facilities for instruction execution, initial program loading and other related functions. The CPU is usually coupled to the SCE via a bi-directional or unidirectional bus. The SCE, which controls the execution and queuing of requests made by the CPU and channel subsystem, is coupled to the main storage, CPUs and the channel subsystem via different busses.

The channel subsystem directs the flow of information between I/O devices and main storage and relieves the CPUs of the task of communicating directly with the I/O devices so that data processing operations directed by the CPU can proceed concurrently with I/O processing operations. The channel subsystem uses one or more channel paths as the communication links in managing the flow of information to or from I/O devices. Each channel path consists of one or more channels, located within the channel subsystem, and one or more control units. In one preferred embodiment, a SAP I/O processor is also included as part of the channel subsystem.

As can be seen in FIG. 1, it is also possible to have one or more dynamic switches or even a switching fabric (network of switches) included as part of the path, coupled to the channel(s) and the control unit(s). Each control unit is further attached via a bus to one or more I/O device(s).

The subchannel is the means by which the channel subsystem provides information about associated I/O devices to the central processing units; the CPUs obtain this information by executing I/O instructions. The subchannel consists of internal storage that contains information in the form of a channel command word (CCW) address, channel path identifier, device number, count, status indications, and I/O interruption subclass code, as well as information on path availability and functions pending or being performed. I/O operations are initiated with devices by executing I/O instructions that designate the subchannel associated with the device.

The execution of input/output operations is accomplished by the decoding and executing of CCWs by the channel subsystem and input/output devices. A chain of CCWs (input/output operations) is initiated when the channel transfers to the control unit the command specified by the first channel command word. During the execution of the specified chain of I/O operations, data and further commands are transferred between the channel(s) and the control unit(s).

Figure 2:
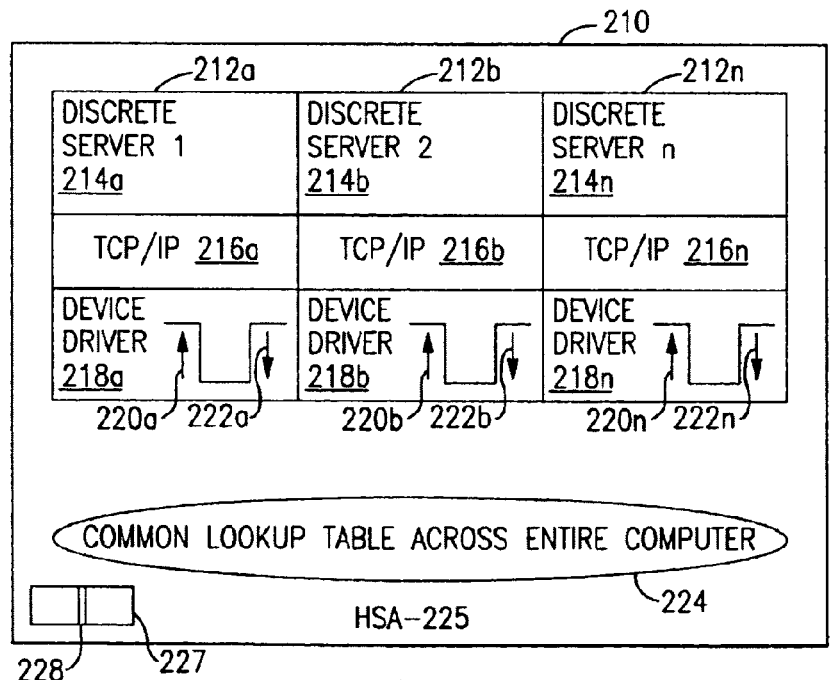
FIG. 2 is a schematic diagram of a single computer with shared physical memory and a plurality of discrete servers with a common lookup table of the present invention for transferring data from a sending discrete server to a target discrete server.

FIG. 2 is a schematic diagram of a single computer with shared physical memory 210, and may be an IBM z/Series z/900 computer available from International Business Machines Corporation of Armonk, N.Y. which is a follow-on computer of the IBM S/390 computer. The computer is divided up into a number logical partitions 212a–212n, each partition having discrete servers 214a–214n, respectively, labeled in FIG. 2 as discrete server 1 to discrete server n. Each discrete server has a TCP/IP layer 216a–216n, respectively, for handling the transmission protocols for transmitting data in Input/Output (I/O) operations for networks, as is well known. Under each TCP/IP layer 216a–216n is a device driver 218a–218n, respectively, for driving data transmissions between the discrete servers, as will be discussed, In the present invention, each device driver is similar to device drivers which drive the devices 190 of FIG. 1. However the device drivers 218 of FIG. 2, rather than driving I/0 devices, drive data exchanges between the LPAR partitions, as will be explained. Each device driver 218 has a send queue 222, and a receive or target queue 220; the send queue 222 being used for sending data from the respective discrete server 214 when that discrete server is the sending server, and the receive queue 220 for receiving data for its respective discrete server 214 when that discrete server is the target server in a send operation, as will be described in connection with FIG. 3. A common lookup table 224 is in the HSA portion 225 of the main storage 110 of the single computer 210 across the entire computer, as explained in FIG. 1. This common lookup table 224 is a centralized table defining the discrete servers 214a–214n within the computer 210 and is maintained in HSA 225 that is accessible by all the discrete servers 214a–214n. However, the discrete servers can only register in the common lookup table using I/O type commands, and cannot retrieve any information from the lookup table 224, thus maintaining security between the servers.

Each device driver 218 is associated with a subchannel control block 227 which contains control information for the subchannel. As is known, the subchannel control blocks exist in HSA 225 and are uniquely identified by a subchannel number. The subchannel control block 227 includes an internal queued direct I/O (IQDIO) indicator 228 which indicates if this subchannel is an IQDIO subchannel. The IQDIO indicator 228 may be set by the channel path identifier (CHPID) definition statement during the configuration process, as is well known in the art.

The architecture of the computer 210 of the present invention adheres to the queued direct I/O (QDIO) architecture, as explained in U.S. patent application Ser. No. 09/253,246 filed Feb. 19,1999 by Baskey et al. for A METHOD OF PROVIDING DIRECT DATA PROCESSING ACCESS USING A QUEUED DIRECT INPUT-OUTPUT DEVICE, owned by the assignee of the present invention and incorporated herein by reference.

Figure 3:
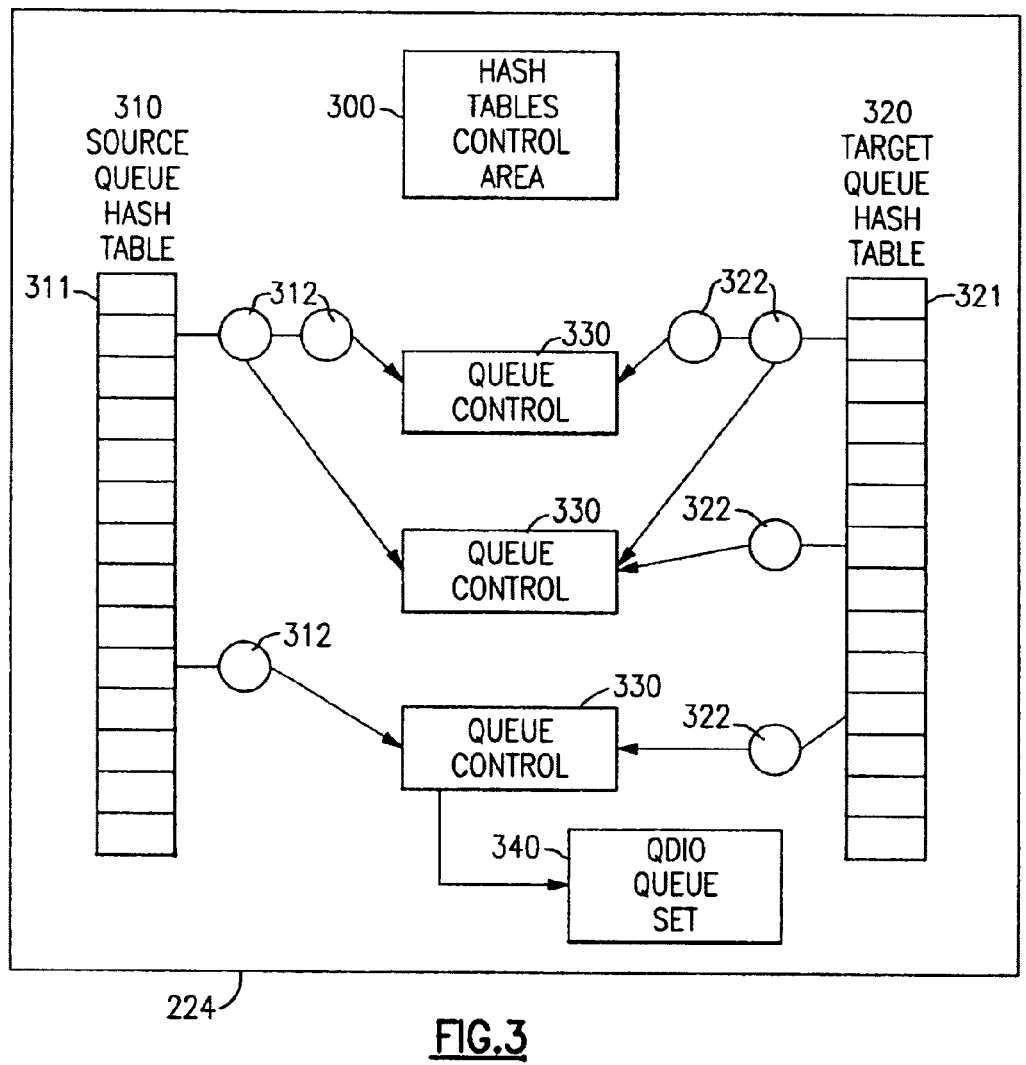
FIG. 3 is a schematic diagram illustrating the common lookup table of FIG. 2 including a hash tables control area, an source queue hash table, a target queue hash table, multiple queue controls, multiple QDIO queue sets, and means to add entries to the source queue hash table and target queue hash table.

FIG. 3 is an illustration of the common lookup table 224 of FIG. 2, and includes hash tables control area 300, a source queue hash table 310, and a target queue hash table 320. The source queue hash table includes multiple entries starting with the first entry 311, each entry acting as a source queue duplicate list head (containing a pointer to duplicate list entries 312). The target hash table 320 includes multiple entries starting with the first entry 321, each entry acting as a target queue duplicate list head (containing a pointer to duplicate list entries 322). A common queue control area 330 is shared by both send (using table 310) and receive (using table 320) processing. It will be noted that multiple 322s can point to a single 330. Each queue control 330 is linked to a QDIO queue set 340. New entries in the source queue hash table 310 are created at 312, and new entries in the target queue hash table 320 are created at 322, as will be explained.

Figure 4:
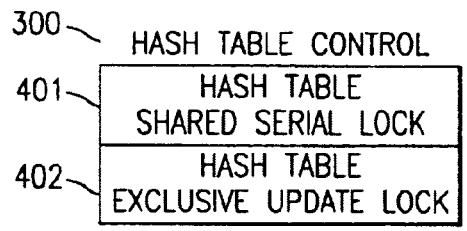
FIG. 4 is a diagram of the hash tables control area of FIG. 3.
Figure 5:
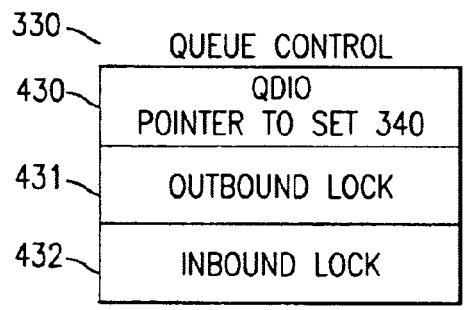
FIG. 5 is a diagram illustrating one of the queue controls of FIG. 3.

FIG. 4 is a block diagram of the hash table control 300 and includes a hash table shared serialization lock 401, and a hash table exclusive update lock. FIG. 5 is a block diagram of the queue control 330 and includes a QDIO pointer 430 which points to the queue set 340, an outbound lock 431, and an inbound lock 432.

Figure 6:
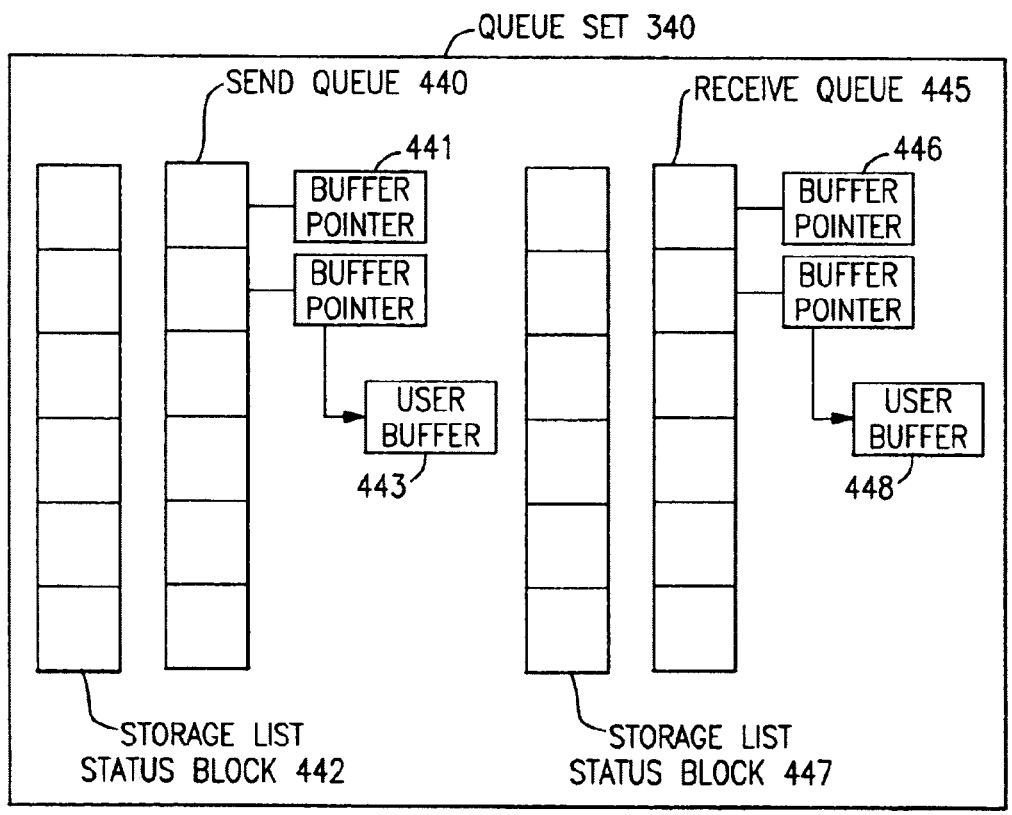
FIG. 6 is a diagram illustrating one of the queue sets of FIG. 3.
Figure 7:
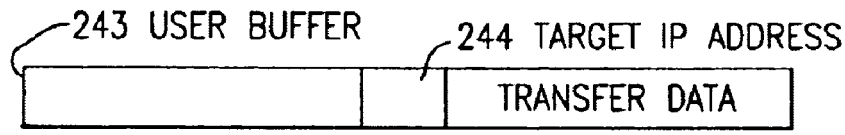
FIG. 7 is a diagram illustrating a send queue user buffer of the queue set of FIG. 6.

FIG. 6 is a block diagram of the queue set 340 of FIG. 3 and includes a send queue 440 having multiple entries, and a receive queue 445 having multiple entries. The queue set 340 also includes a storage list status block (SLSB) 442 which shows the status of each entry in the send queue 440, and a storage list status block (SLSB) 447 which shows the status of each entry in the receive queue 445. Each active entry of the send queue 440 has an associated buffer pointer 441 which points to a user buffer 443 for containing the data to be sent to the target LPAR partition. FIG. 7 is an illustration of the transfer data in the user buffer 243, and includes the target IP address 244 to which the data is to be sent. Each active entry in the receive queue 445 is associated with a buffer pointer 446 which points to a user buffer 448 which is to receive the data transferred from the user buffer 443.

Figure 8:
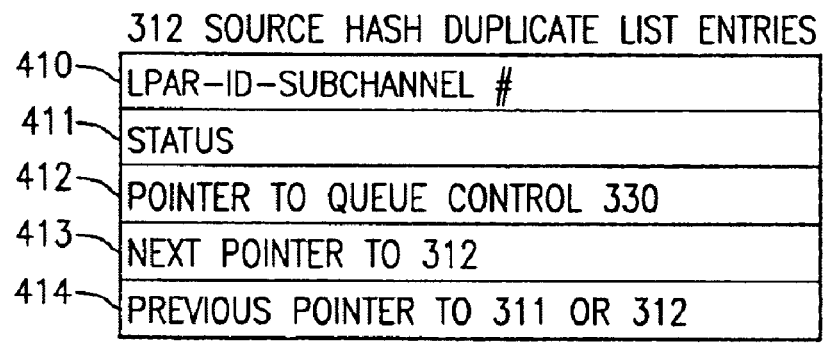
FIG. 8 is a diagram illustrating one of the entries of the source hash table of FIG. 3.
Figure 9:
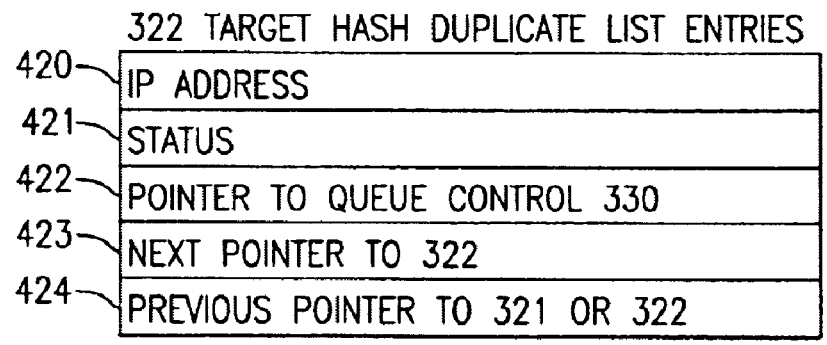
FIG. 9 is a diagram illustrating one of the entries of the target hash tables of FIG. 3.

FIG. 8 is a block diagram illustrating the entries of the source queue hash table list 310 as setup at 312. Each entry includes the LPAR-ID.SUBCHANNEL#410 used as a key to the table 311, the status 411 of the entry, the queue control pointer 412 which points to the control 330 for this entry, a next pointer 413 which points to the next entry 312 in the source hash table 310, and a previous pointer 414 which points to either the first entry 311 in the source hash table 310 or the previous entry created at 312. Similarly, FIG. 9 is a block diagram illustrating the entries of the target queue hash table as set up at 322. Each entry includes the IP address 420 used as a key to the table 321, the status 421 of the entry, a queue control pointer 422 which points to the control 330 for this entry, a next pointer 423 which points to the next entry 322 in the target hash table 320, and a previous pointer 424 which points to either the first entry 321 in the target hash table 320 or the previous entry created at 322.

The first step in transferring data from one LPAR partition to another, is to register a source or send queue 222 (represented in FIG. 2 as a downward arrow, and also shown as queue 440 in FIG. 6) and a receive or target queue 220 (represented in FIG. 2 as an upward arrow, and also shown as queue 445 in FIG. 6) for a send transaction. The registration process includes two steps: the first is to register the QDIO queue set 340 (one send queue 222 and one target queue 220) in the source queue hash table 310; and the second is to associate one or more IP addresses with the previously defined QDIO set 340 by adding entries to the target queue hash table 320. As each QDIO queue set 340 contains both a send queue 222 and a receive queue 220, both types of hash entries resolve into a single queue control structure 330 that contains a pointer to the QDIO defined queues The source queue hash table registration is as follows:
a. obtain the exclusive update lock 402 for the hash tables. Updates to both types of hash tables can be serialized with a single lock.
b. using the LPAR-ID.SUBCHANNEL# as key into the source hash table 310, determine the appropriate duplicate list header location 311 in the source queue hash table 310.
c. once found, use the pointers 413 and 414 in a well known fashion to scan all hash key duplicate entries for an exact match with the LPAR-ID.SUBCHANNEL# being added. If found, then return the Duplicate Found error return to the TCP stack for the error to be dealt with there.
d. if there are no duplicates, at 312, add an entry to the source queue hash table 310.
e. create the queue control 330 that is to be associated with the newly created entry.
f. release the exclusive update lock 402 for the hash tables.

The target queue hash table registration is as follows:
a. obtain exclusive lock 402 for the hash tables. Again, updates to both types of hash tables can be serialized with a single lock.
b. using the target IP address as the key, determine the appropriate duplicate list header location in the target queue hash table 321.
c. once found, use the pointers 423 and 424 in a well known fashion to scan all hash key duplicates for an exact match with the target IP addresses being added. If a duplicate is found, then return a Duplicate Found error to the TCP stack for the error to be handled there.
d. if no duplicates are found, at 322, add an entry to the target queue hash table 321.
e. using the LPAR-ID.SUBCHANNEL# from the input, perform a search of the source queue hash table 310 to find the previously defined queue control 330 that is to be associated with the newly created entry.
f. release the exclusive update lock 402 for the hash tables.

A send operation to send data from one LPAR partition to another is as follows:
a. As part of the processing of a socket API, the device driver 218 (software) modifies the send queue 440 (shown as downward arrow 222 in FIG. 2) to prime it with data to be transferred.
b. a send is initiated by a SIGA instruction to the device driver 218. This SIGA instruction explained in the aforementioned application Ser. No. 09/253,246 includes the subchannel number associated with the send queue 222.

c. the IQDIO indicator 228 of the subchannel control block 227 for the designated subchannel indicates that this is a IQDIO subchannel and that the send operation is to use the queue set 340 associated with this subchannel.

d. the shared serialization lock 401 is obtained for the queue lookup table 224 access.

e. the LPAR-ID from which the SIGA instruction is issued and the subchannel number in the instruction is used to build the LPAR-ID.SUBCHANNEL# key into the source hash table 310.

f. obtain the outbound lock 431 to obtain exclusive serialization of the queue control 130 for the located entry in the source hash table 310.

g. search the SLSB 442 to find the primed outbound storage buffer access list (SBAL) (shown as the buffer pointer 441) which points to the storage buffer access list element (SBALE) describing the packet of data to be moved to the target IP address.

h. using the located SBAL, extract the destination IP address 244 from the outbound user buffer 443.

i. use the IP address 244 to search the target queue hash table 320 to find the table entry 322 for the queue descriptor of the receive queue 220/445.

j. obtain the inbound lock 432 to obtain exclusive serialization of the queue control 330 associated with the located target hash table entry 322.

k. The SLSB 447 of the receive queue 445 is searched to find an empty SBAL to receive the data.

l. move the data in user buffer 443 of the send queue 440 to the user buffer 448 of the receiver queue 445 using internal millicode mechanism that overrides the normal restrictions on data moves between storage addresses in different LPAR partitions.

m. update the SLSB 442 of the send queue 440 and the SLSB 447 of the receive queue 445. These updates are visible to the software and allows program manipulation of the send and receive queues 222 and 220.

n. release the shared serialization lock 401.

o. set a program initiative of either a polling paradigm or a program interrupt, or some combination, for the partition that contains the receive queue 220 to indicate that new elements or data are available on the receive queue 220. Having been thus informed, software in the target partition may process the data in its receive queue 220.

It will be understood that in the present embodiment, steps b-o of the send operation are performed by hardware, making the performance of these steps very reliable and at hardware speed. However, these steps, or some portion of them, could be done in software, if desired. This invention may also be used to transfer data between multiple virtual servers within a single partition.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. In a data processing system having multiple logical partitions, a method of sending data from a first logical partition to a second logical partition comprising:

establishing a send queue in the first logical partition;

establishing a receive queue in the second logical partition;

registering the send queue in a lookup table available to all of the logical partitions;

registering the receive queue in said lookup table; and executing a send from the first logical partition which interrogates the lookup table to locate said send queue and said receive queue and sends the data in the send queue in the first logical partition to the receive queue in the second logical partition, wherein input/output (I/O) operations for each logical partition is conducted via a subchannel associated with each logical partition, each logical partition having an identification, and the send queue is registered in said lookup table using the logical partition identification and subchannel number as a key.

2. The method of claim 1 wherein said receive queue has an internet protocol (IP) address and said receive queue is registered in said lookup table using the IP address of the receive queue as the key.

3. The method of claim 2 further comprising linking the registration using said logical partition identification and subchannel number with the registration of said IP address by a queue control which points to said send queue and said receive queue.

4. The method of claim 3 further comprising setting an indication in the hardware storage area indicating that the send instructions from the subchannel of the first logical partition is to send data from said send queue of the first logical partition to the receive queue of the second logical partition, and said send instruction interrogates said indication.

5. The method of claim 4 further comprising:

priming said send queue with data to be transferred, said data including the IP address of the receive queue to which said data is to be transferred;

searching said lookup table using the logical partition identification and subchannel number as a key to locate the send register registered in the lookup table with that key;

interrogating the data in said send queue to find the IP address of the receive queue;

searching said lookup table using said IP address as a key to locate the receive queue registered in the lookup table with that key; and sending the data in the located send queue to the located receive queue to complete the transfer.

6. In a data processing system having multiple logical partitions, an apparatus for sending data from a first logical partition to a second logical partition comprising:

means for establishing a send queue in the first logical partition;

means for establishing a receive queue in the second logical partition;

means for registering the send queue in a lookup table available to all of the logical partitions;

means for registering the receive queue in said lookup table; and means for executing a send from the first logical partition which interrogates the lookup table to locate said send queue and said receive queue and sends the data in the send queue in the first logical partition to the receive queue in the second logical partition, further comprising a subchannel associated with each logical partition for conducting input/output (I/O) operations for the associated logical partition, each logical partition having an identification, and said means for registering said send queue registering said send queue in said lookup table using the logical partition identification and subchannel number as a key.

7. The apparatus of claim 6 wherein said receive queue has an internet protocol (IP) address and said means for registering said receive queue in said lookup table registering said receive queue using the IP address of the receive queue as the key.

8. The apparatus of claim 7 further comprising queue control for linking the registration using said logical partition identification and subchannel number with the registration of said IP address, said queue control pointing to said send queue and said receive queue.

9. The apparatus of claim 8 further comprising an indication in the hardware storage area for interrogation by said send instruction, said indication when set indicating when send instructions from the subchannel of the first logical partition is to send data from said send queue of the first logical partition to the receive queue of the second logical partition.

10. The apparatus of claim 9 further comprising:
    means for priming said send queue with data to be transferred, said data including the IP address of the receive queue to which said data is to be transferred;
    means for searching said lookup table using the logical partition identification and subchannel number as a key to locate the send register registered in the lookup table with that key;
    means for interrogating the data in said send queue to find the IP address of the receive queue;
    means for searching said lookup table using said IP address as a key to locate the receive queue registered in the lookup table with that key; and
    means for sending the data in the located send queue to the located receive queue to complete the transfer.

11. In a data processing system having multiple logical partitions, an apparatus for sending data from a first logical partition to a second logical partition comprising:
    a send queue in the first logical partition;
    a receive queue in the second logical partition;
    a lookup table available to all of the logical partitions, said lookup table having registered therein said send queue and said receive queue; and
    a device driver in said first logical partition which executes a send for interrogating the lookup table to locate said send queue and said receive queue, and sending the data in the send queue in the first logical partition to the receive queue in the second logical partition,
    further comprising a subchannel associated with each logical partition for conducting input/output (I/O) operations for the associated logical partition, each logical partition having an identification, and said send queue is registered in said lookup table using the logical partition identification and subchannel number as a key.

12. The apparatus of claim 11 wherein said receive queue has an internet protocol (IP) address and said receive queue is registered in said lookup table using the IP address of the receive queue as the key.

13. The apparatus of claim 12 further comprising queue control for linking the registration using said logical partition identification and subchannel number with the registration of said IP address, said queue control pointing to said send queue and said receive queue.

14. The apparatus of claim 12 further comprising an indication in the hardware storage area for interrogation by said send instruction, said indication when set indicating when said send instruction from the subchannel of the first logical partition is to send data from said send queue of the first logical partition to the receive queue of the second logical partition.

15. The apparatus of claim 14 further comprising:
    data to be transferred in said send queue, said data including the IP address of the receive queue to which said data is to be transferred;
    hardware searching said lookup table using the logical partition identification and subchannel number as a key to locate the send register registered in the lookup table with that key;
    hardware interrogating the data in said send queue to find the IP address of the receive queue;
    hardware searching said lookup table using said IP address as a key to locate the receive queue registered in the lookup table with that key; and
    means in said device driver for sending the data in the located send queue to the located receive queue to complete the transfer.

* * * * *